United States Patent Office 3,041,365
Patented June 26, 1962

3,041,365
S-(2-CYANOALKYL) PHOSPHONOTHIOATES
John P. Chupp, Kirkwood, and Peter E. Newallis, Crestwood, Mo., assignors to Monsanto Chemical Company, St. Louis, Mo., a corporation of Delaware
No Drawing. Filed Sept. 27, 1960, Ser. No. 58,644
7 Claims. (Cl. 260—461)

This invention relates to a new and useful method for making certain insecticidally active S-(2-cyanoalkyl) phosphonothioates described in said copending application.

The compounds obtained by the method of this invention can be termed S-(2-cyanoalkyl) phosphonothioates and can be represented by the structure

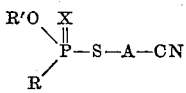

wherein R is phenyl or an alkyl radical containing from 1 to 5 carbon atoms (i.e. methyl, ethyl, propyl, butyl, amyl, and the various isomeric forms thereof), wherein R' is an alkyl radical containing from 1 to 4 carbon atoms (i.e. methyl, ethyl, propyl, butyl, and the various isomeric forms thereof), wherein X is a chalkogen of atomic weight less than 40 (i.e. sulfur or oxygen), and wherein A is a divalent aliphatic hydrocarbon radical having a chain length of two carbon atoms connecting the cyano group and the sulfur atom and containing not more than six carbon atoms (e.g. —$CH_2CH_2$—, —$CH_2CH(CH_3)$—, —$CH(C_2H_5)CH_2$—, etc.). As noted in copending application Serial No. 7,747 the preferred compounds for insecticidal purposes are those of the foregoing structure wherein R and R' are alkyl radicals containing 1 to 3 carbon atoms.

In accordance with this invention the aforedescribed S-(2-cyanoalkyl) phosphonothioates are prepared by reacting a phosphonothioic acid of the structure

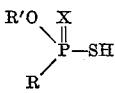

wherein R, R' and X have the aforedescribed significance with a substantially equimolecular amount of a 1-cyano substituted olefin of the structure

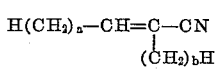

wherein a and b are like or unlike integers from 0 to 2 (e.g. acrylonitrile, methacrylonitrile, ethacrylonitrile, prop-1-enyl cyanide, but-1-enyl cyanide, 1-methyl prop-1-enyl cyanide, etc.). In general it is preferred that a be zero and it is particularly preferred that a and b be zero. Where desired an inert organic liquid or solvent (e.g. benzene, toluene, xylene, acetone, butanone, etc.) can be employed. While a wide range of reaction temperatures can be employed provided the system is fluid (i.e. above the freezing point of the system up to and including the boiling point of the system) it is preferred to employ a reaction temperature in the range of from about 10° C. to about 120° C. If desired a catalyst can be employed to accelerate the reaction, the aliphatic tertiary amines (e.g. triethylamine, triisopropylamine, tributylamine, and the like) being particularly useful. Any catalytic amount can be used which amount generally will be in the range of 0.2 to 2 percent by weight of the total weight of the reactants. When and where desired a polymerization inhibitor such as hydroquinone can be used, which amount generally will be in the range of 0.05 to 4.0 percent by weight of the olefin reactant.

As illustrative of the process of this invention is the following:

Example I

To a suitable reaction vessel equipped with a thermometer, agitator and reflux condenser is charged 15.6 parts by weight of O-ethyl methylphosphonodithioic acid, 0.3 part by weight of triethylamine, about 40 parts by weight of benzene and 0.1 part by weight of hydroquinone. While agitating this mass there is added about 5.3 parts by weight of acrylonitrile. The mass is then heated at 60–80° C. for 8 hours, and then cooled to room temperature. The so-cooled reaction mass is then washed first with 5% aqueous sodium carbonate and then twice with water. The so-washed mass is then subjected to vacuum distillation to remove the benzene. The residue, 18.1 parts by weight of a yellow oil, is O-ethyl S-(2-cyanoethyl) methylphosphonodithioate which is soluble in chloroform and acetone but insoluble in water.

Analysis.—Theory: 30.6% S, 14.8% P, 6.7% N. Found: 30.2% S, 14.5% P, 6.1% N.

Example II

Employing the procedure of Example I but replacing O-ethyl methylphosphonodithioic acid with an equimolecular amount of O-methyl methylphosphonodithioic acid there is obtained as an oil, O-methyl S-(2-cyanoethyl) methylphosphonodithioate which is soluble in acetone but insoluble in water.

Analysis.—Theory: 32.8% S, 15.9% P. Found: 32.7% S, 15.4% P.

Example III

Employing the procedure of Example I but replacing O-ethyl methylphosphonodithioic acid with an equimolecular amount of O-ethyl methylphosphonothioic acid there is obtained as a water-insoluble oil O-ethyl S-(2-cyanoethyl) methylphosphonothioate.

Example IV

Employing the procedure of Example I but replacing O-ethyl methylphosphonodithioic acid with an equimolecular amount of O-methyl methylphosphonothioic acid there is obtained O-methyl S-(2-cyanoethyl) methylphosphonothioate which is insoluble in water but soluble in acetone.

Example V

Employing the procedure of Example I but replacing O-ethyl methylphosphonodithioic acid with an equimolecular amount of O-isopropyl phenylphosphonodithioic acid there is obtained O-isopropyl S-(2-cyanoethyl) phenylphosphonodithioate which is soluble in acetone but insoluble in water.

Example VI

Employing the procedure of Example I but replacing acrylonitrile with an equimolecular amount of methacrylonitrile there is obtained O-ethyl S-(2-cyanopropyl) methylphosphonodithioate, and oil which is soluble in acetone but insoluble in water.

Example VII

Employing the procedure of Example I but replacing acrylonitrile with an equimolecular amount of prop-1-enyl cyanide there is obtained O-ethyl S-(1-methyl-2-cyanoethyl) methylphosphonodithioate, an oil which is soluble in acetone but insoluble in water.

In copending application Serial No. 7,747 the products of the process of this invention are disclosed as having insecticidal activity, for example, at a concentration of 0.0016% by weight in an aqueous emulsion O-ethyl S-(2-cyanoethyl) methylphosphonodithioate exhibited a 100% kill of the mobile stages of the two-spotted spider mite, Tetranychus telarius (L.).

While this invention has been described with respect to certain embodiments it is not so limited and it is to be understood that variations and modifications thereof obvious to those skilled in the art can be made without departing from the spirit or scope of this invention. This application is a continuation-in-part of copending application Serial No. 7,747, filed February 10, 1960.

What is claimed is:

1. The method of making S-(2-cyanoalkyl) phosphonothioates of the structure

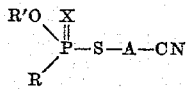

wherein R is selected from the group consisting of phenyl and alkyl radicals containing 1 to 5 carbon atoms, wherein R' is an alkyl radical containing from 1 to 4 carbon atoms, where X is a chalkogen of atomic weight less than 40, and wherein A is a divalent aliphatic hydrocarbon radical having a chain length of two carbon atoms connecting the sulfur atom and the cyano group and containing not more than 6 carbon atoms, which comprises reacting a phosphonothioic acid of the structure

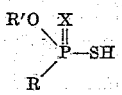

wherein R, R' and X have the aforementioned significance with a substantially equimolecular amount of a 1-cyano substituted olefin of the structure $$H(CH_2)_a-CH=C-CN$$
$$|$$
$$(CH_2)_bH$$

wherein $a$ and $b$ are integers from 0 to 2.

2. The method of claim 1 wherein the 1-cyano substituted olefin reactant is

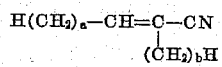

wherein $b$ is an integer from 0 to 2.

3. The method of claim 1 wherein the 1-cyano substituted olefin reactant is acrylonitrile.

4. The method of making O-alkyl S-(2-cyanoethyl) alkylphosphonothioates which comprises reacting acrylonitrile with a substantially equimolecular amount of a phosphonothioic acid of the structure

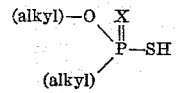

wherein X is a chalkogen of atomic weight less than 40 and wherein the respective alkyl substituents contain from 1 to 3 carbon atoms.

5. The method of claim 4 wherein X is sulfur, the method being carried out in the presence of a catalytic amount of an aliphatic tertiary amine.

6. The method of making O-ethyl S-(2-cyanoethyl) methylphosphonodithioate which comprises reacting acrylonitrile with a substantially equimolecular amount of O-ethyl methylphosphonodithioic acid in the presence of a catalytic amount of triethylamine.

7. The method of making O-alkyl S-(2-cyanoethyl) alkylphosphonodithioates which comprises reacting acrylonitrile with a substantially equimolecular amount of a phosphonodithioic acid of the structure

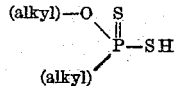

wherein the respective alkyl substituents contain from 1 to 3 carbon atoms.

No references cited.